(12) United States Patent
Pasqualini

(10) Patent No.: US 7,098,706 B1
(45) Date of Patent: Aug. 29, 2006

(54) HIGH SPEED SYNCHRONIZER FOR SIMULTANEOUSLY INITIALIZING RISING EDGE TRIGGERED AND FALLING EDGE TRIGGERED FLIP-FLOPS

(75) Inventor: Ronald Pasqualini, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 44 days.

(21) Appl. No.: 10/959,573

(22) Filed: Oct. 6, 2004

(51) Int. Cl.
*H03L 7/00* (2006.01)
(52) U.S. Cl. ...................................... 327/141; 327/142
(58) Field of Classification Search ................ 327/141, 327/142, 143, 144, 145, 217, 218; 375/354, 375/355, 356
See application file for complete search history.

(56) References Cited

U.S. PATENT DOCUMENTS

| | | | | |
|---|---|---|---|---|
| 5,557,623 A | * | 9/1996 | Discoll | 714/814 |
| 6,163,584 A | * | 12/2000 | Weng et al. | 375/354 |
| 6,408,340 B1 | * | 6/2002 | Janssen et al. | 709/248 |
| 6,516,040 B1 | * | 2/2003 | Lecourtier et al. | 375/356 |

* cited by examiner

*Primary Examiner*—Linh My Nguyen
(74) *Attorney, Agent, or Firm*—Mark C. Pickering

(57) ABSTRACT

The rising edge triggered flip-flops and falling edge triggered flip-flops in one or more clock domains of a target system can be simultaneously initialized to predetermined logic states by activating the flip-flop set/clear inputs, freezing the flip-flop clock signals high or low, subsequently deactivating the flip-flop set/clear inputs, and then re-enabling the clock signals.

23 Claims, 5 Drawing Sheets

FIG. 1A
(PRIOR ART)
FIG. 1B
(PRIOR ART)
FIG. 1C
(PRIOR ART)
FIG. 1D
(PRIOR ART)
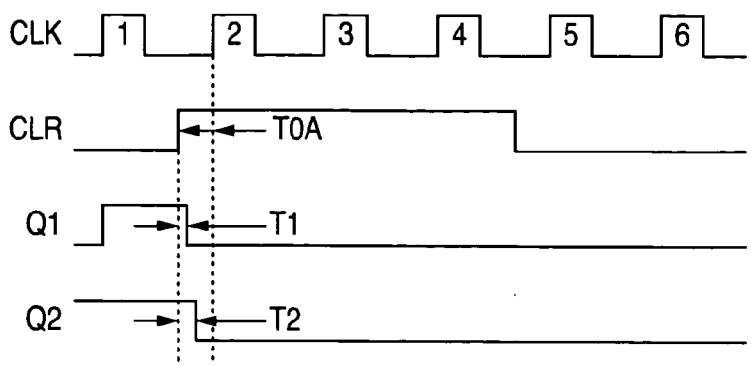
FIG. 2A
(PRIOR ART)
FIG. 2B
(PRIOR ART)
FIG. 2C
(PRIOR ART)
FIG. 2D
(PRIOR ART)
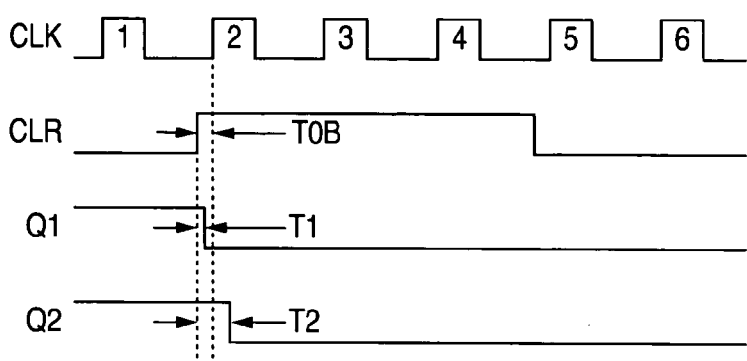
FIG. 3
(PRIOR ART)
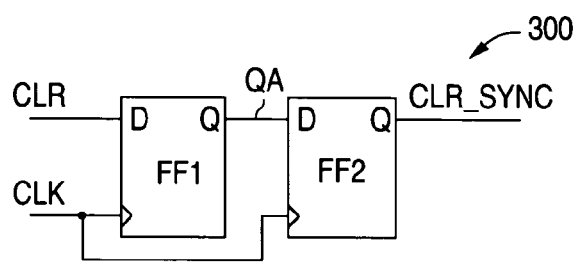
FIG. 4A
(PRIOR ART)
FIG. 4B
(PRIOR ART)
FIG. 4C
(PRIOR ART)
FIG. 4D
(PRIOR ART)
FIG. 4E
(PRIOR ART)
FIG. 4F
(PRIOR ART)
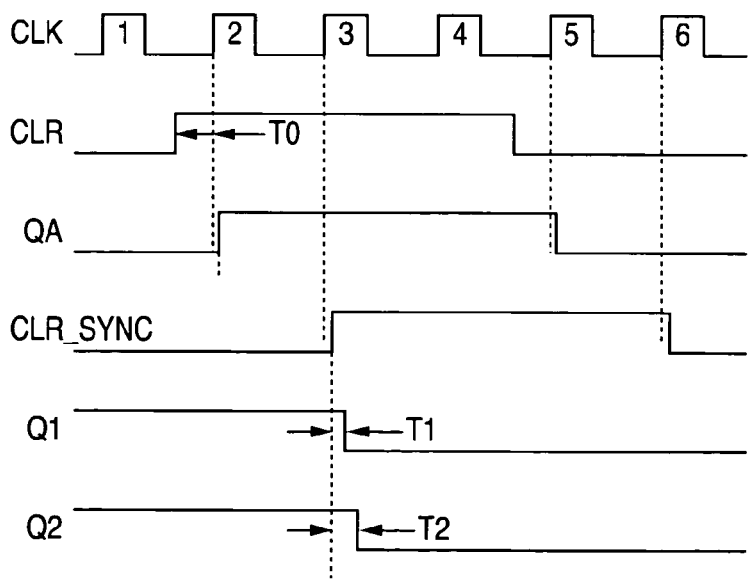

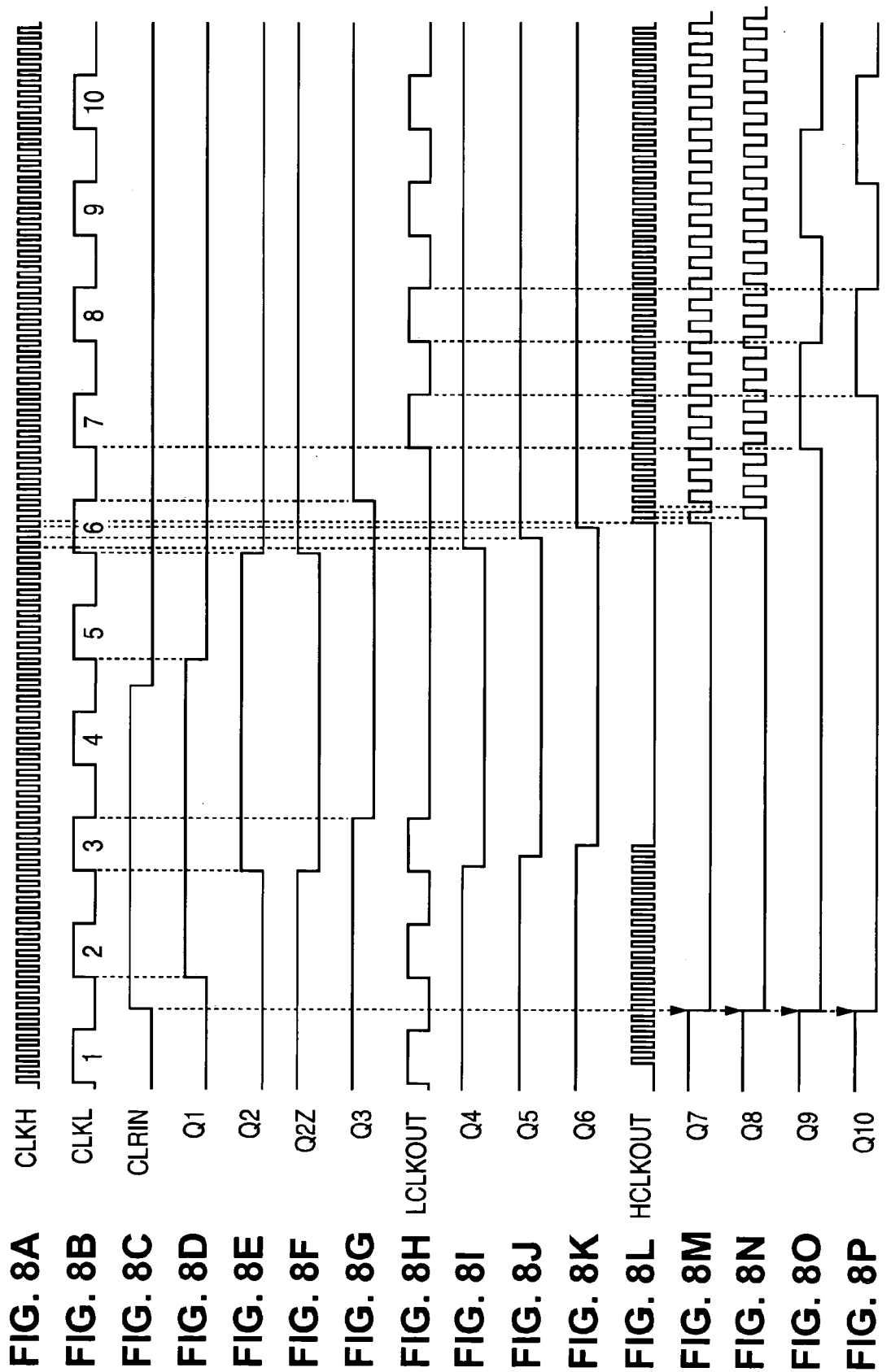

HIGH SPEED SYNCHRONIZER FOR SIMULTANEOUSLY INITIALIZING RISING EDGE TRIGGERED AND FALLING EDGE TRIGGERED FLIP-FLOPS

BACKGROUND OF THE INVENTION

1. Field of the Invention

The present invention relates to synchronizers and, more particularly, to a high speed synchronizer suitable for simultaneously initializing rising edge triggered flip-flops and falling edge triggered flip-flops that can be located in the same clock domain or in different clock domains.

2. Description of the Related Art

A clock domain contains a group of flip-flops that are driven by the same primary clock signal. A logic circuit can include any number of different clock domains. For example, one group of flip-flops can be driven by a first clock signal, while another group of flip-flops can be driven by a second clock signal.

In many cases, the clock signals driving the different clock domains are totally asynchronous to each other. In other words, each primary clock signal can have a different frequency and/or different clock phase and/or different clock width (duty cycle) in comparison to the other primary clock signals.

Many digital logic applications utilize rising edge triggered flip-flops and falling edge triggered flip-flops. These flip-flops can be of several types, including D flip-flops, RS flip-flops, JK flip-flops and toggle flip-flops. For example, a D flip-flop is a logic device that has a D input, a clock input and Q/QZ outputs. A D flip-flop can also have an asynchronous set input and/or an asynchronous clear input. In operation, a D flip-flop stores the logic state on its D input in response to a clock signal on its clock input. Furthermore, a D flip-flop outputs the stored logic state on its Q/QZ outputs, where QZ is the logical complement (inverse) of Q.

A rising edge triggered D flip-flop is a flip-flop that outputs the logic state on its D input in response to a rising edge on its clock input. Similarly, a falling edge triggered D flip-flop is a flip-flop that outputs the logic state on its D input in response to a falling edge on its clock input. Of course, rising edge triggered flip-flops and falling edge triggered flip-flops can be located in the same clock domain or in different clock domains.

Furthermore, the Q output of a rising/falling edge triggered D flip-flop can be initialized to the logic zero state by applying a clear pulse to the flip-flop clear input. The clear pulse is usually asynchronous to the clock pulse. Thus, if the clear pulse is applied by a sufficient time before a given clock pulse, the flip-flop Q output will be set to the logic zero state prior to the next clock pulse.

Similarly, the Q output of a rising/falling edge triggered D flip-flop can be initialized to the logic one state by applying a set pulse to the flip-flop set input. The set pulse is usually asynchronous to the clock pulse. Thus, if the set pulse is applied by a sufficient time before a given clock pulse, the flip-flop Q output will be set to the logic one state prior to the next clock pulse.

FIGS. 1A–1D illustrate the timing of a prior-art clear signal that is being applied to a pair of target flip-flops that are rising edge triggered. As shown in FIGS. 1A–1D, the target flip-flops receive a clock signal CLK and a clear signal CLR, which is asynchronous to the clock signal CLK. Furthermore, the first target flip-flop outputs a signal Q1 that represents the value stored in the first target flip-flop, while the second target flip-flop outputs a signal Q2 that represents the value stored in the second target flip-flop.

As shown in FIGS. 1A–1B, the clear signal CLR rises between the first and second clock pulses of the clock signal CLK, a time TOA before the rising edge of the second clock pulse. In response, the Q1 output of the first target flip-flop is initialized to a logic zero, a propagation delay time T1 following the rising edge of the clear signal CLR. Similarly, the Q2 output of the second target flip-flop is also initialized to a logic zero, a propagation delay time T2 following the rising edge of the clear signal CLR.

Since the propagation delay times T1 and T2 are both less than the time TOA, the first and second target flip-flops will both be in the cleared state before the next rising edge of the clock signal CLK.

FIGS. 2A–2D also show the timing of a prior-art clear signal that is being applied to a pair of target flip-flops that are rising edge triggered. As shown in FIGS. 2A–2D, the target flip-flops receive a clock signal CLK and a clear signal CLR, which is asynchronous to the clock signal CLK. Furthermore, the first target flip-flop outputs a signal Q1 that represents the value stored in the first target flip-flop, while the second target flip-flop outputs a signal Q2 that represents the value stored in the second target flip-flop.

As shown in FIGS. 2A–2B, the clear signal CLR rises between the first and second clock pulses of the clock signal CLK, a time TOB before the rising edge of the second clock pulse. In response, the Q1 output of the first target flip-flop is initialized to a logic zero, a propagation delay time T1 following the rising edge of the clear signal CLR. Similarly, the Q2 output of the second target flip-flop is also initialized to a logic zero, a propagation delay time T2 following the rising edge of the clear signal CLR.

Referring to FIGS. 2A–2D, it can be seen that propagation delay time T1 is shorter than the time TOB, whereas propagation delay time T2 is longer than the time TOB. As a result, the Q1 output of the first target flip-flop falls to zero before the rising edge of the next clock pulse, whereas the Q2 output of the second target flip-flop falls to zero after the rising edge of the next clock pulse. Therefore, both target flip-flops are not initialized to zero prior to the next rising edge of the clock signal CLK.

In order to insure that all of the rising edge triggered flip-flops in a given clock domain are properly cleared, the time interval from the rising edge of the clear signal to the next rising edge of the clock signal must be greater than the longest clear signal propagation delay time for the slowest flip-flop. Therefore, in order to insure that there is sufficient time to initialize each flip-flop in a given clock domain, the rising edge of the clear signal is usually synchronized to, and nearly aligned with, the rising edge of the clock signal.

FIG. 3 shows a block diagram that illustrates a prior-art, rising edge triggered clear signal synchronizer 300. This circuit insures that the rising edge of the clear signal is synchronized to, and nearly aligned with, the rising edge of the clock signal.

As shown in FIG. 3, synchronizer 300 includes a first flip-flop FF1 and a second flip-flop FF2 that are connected as a two bit shift register. (Two flip-flops are employed, instead of one, in order to greatly reduce the probability that the second flip-flop output will go into a meta-stable state). Flip-flop FF1 includes a D input that receives a clear signal CLR, a clock input that receives a clock signal CLK, and a Q output that generates a flip-flop output signal QA.

Furthermore, flip-flop FF2 includes a D input that receives the QA signal from the Q output of flip-flop FF1, a clock input that receives the clock signal CLK, and a Q output that generates a synchronized clear signal CLR_SYNC.

FIGS. 4A–4F show timing diagrams that illustrate the operation of synchronizer 300. As shown in FIGS. 4A–4F, the clear signal CLR rises to a logic high between the first and second clock pulses of the clock signal CLK. In particular, the clear signal CLR rises to a logic high at a time T0 before the rising edge of the second clock pulse. Assuming that the setup time of flip-flop FF1 has been met, flip-flop FF1 will capture the logic high on its D input on the rising edge of the second clock pulse. Thus, at a propagation delay time after the clock signal CLK rises, flip-flop FF1 will output the QA signal as a logic high on its Q output.

Referring to FIGS. 4A–4F, flip-flop FF2 captures the logic high on its D input on the rising edge of the third pulse of the clock signal CLK. Thus flip-flop FF2 outputs the synchronized clear signal CLR_SYNC as a logic high on its Q output, at a propagation delay time after the clock signal CLK rises. As shown in FIGS. 4A–4F, the clear signal CLR_SYNC is synchronized to, and nearly aligned with, the rising edge of the clock signal CLK.

The synchronized clear signal CLR_SYNC is then fed into the clear input of a target pair of rising edge triggered flip-flops. The first target flip-flop outputs a signal Q1 that represents the value stored in the first target flip-flop. Similarly, the second target flip-flop outputs a signal Q2 that represents the value stored in the second target flip-flop.

As shown in FIGS. 4D–4F, in response to the rising edge of the synchronized clear signal CLR_SYNC, the Q1 output from the first target flip-flop is initialized to a logic zero at a propagation delay time T1 after the rising edge of the clock signal CLK. Similarly, in response to the rising edge of the synchronized clear signal CLR_SYNC, the Q2 output from the second target flip-flop is initialized to a logic zero at a propagation delay time T2 after the rising edge of the clock signal CLK.

Thus, as shown in FIGS. 4D–4F, since the rising edge of the clear signal CLR_SYNC is synchronized to, and nearly aligned with, the rising edge of the clock signal CLK, the target flip-flops have nearly a complete clock period to respond to the clear signal (e.g., initialize their Q outputs to a logic zero) before the next rising edge of the clock signal CLK. In other words, as long as the propagation delay times T1 and T2 are both less than the clock period (which is almost always the case), both target flip-flops will be properly cleared to zero before the rising edge of the next (e.g. fourth) clock pulse.

Therefore, synchronizer 300 insures that a number of rising edge triggered flip-flops with different propagation delay times can be cleared to a known state before the rising edge of the next clock signal CLK. Similarly, by converting flip-flops FF1 and FF2 into falling edge triggered flip-flops (using inverted clock inputs), the resulting circuit insures that a number of falling edge triggered flip-flops with different propagation delay times can also be initialized to a known state before the falling edge of the next clock signal CLK.

Nevertheless, a serious limitation of synchronizer 300 is that it cannot clear rising edge triggered flip-flops and falling edge triggered flip-flops at the same time. The reason for this is that synchronizer 300 cannot synchronize the clear signal CLR_SYNC to both edges of the clock signal CLK at the same time. Thus there is a definite need for an improved synchronization circuit that can simultaneously clear rising edge triggered flip-flops and falling edge triggered flip-flops at the same time.

BRIEF DESCRIPTION OF THE DRAWINGS

FIGS. 1A–1D are timing diagrams illustrating the timing of a prior art clear signal as used with a target pair of rising edge triggered flip-flops.

FIGS. 2A–2D are timing diagrams that also illustrate the timing of a prior art clear signal as used with a target pair of rising edge triggered flip-flops.

FIG. 3 is a block diagram illustrating a prior art rising edge triggered clear signal synchronizer 300.

FIGS. 4A–4F are timing diagrams illustrating the operation of synchronizer 300.

FIGS. 8A–8P are timing diagrams illustrating the operation of synchronizer 700 and target system 710 in accordance with the present invention.

DETAILED DESCRIPTION OF THE INVENTION

Figure 5:
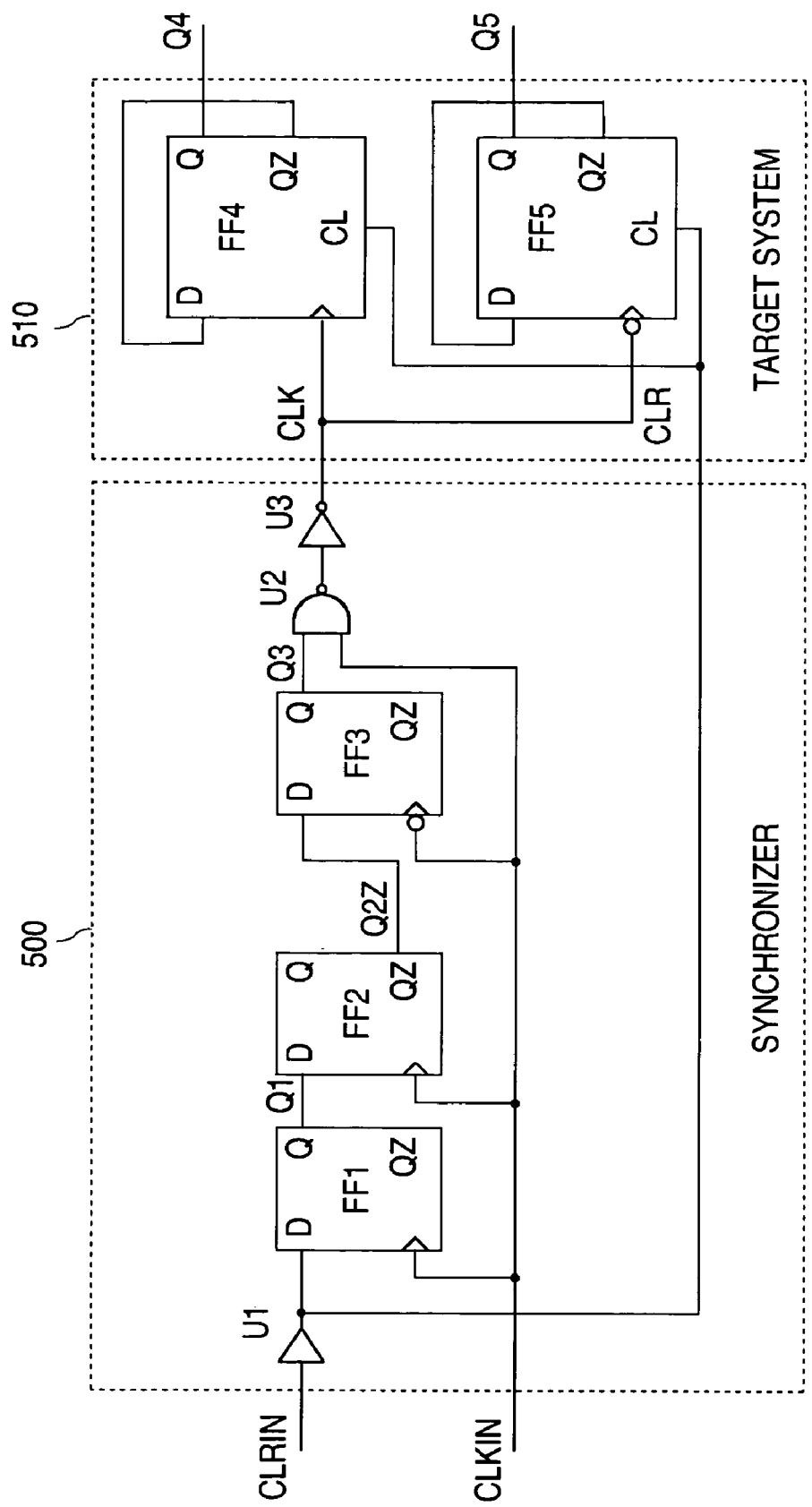
FIG. 5 is a block diagram illustrating an example of a synchronizer 500 in accordance with the present invention.
Figure 6:
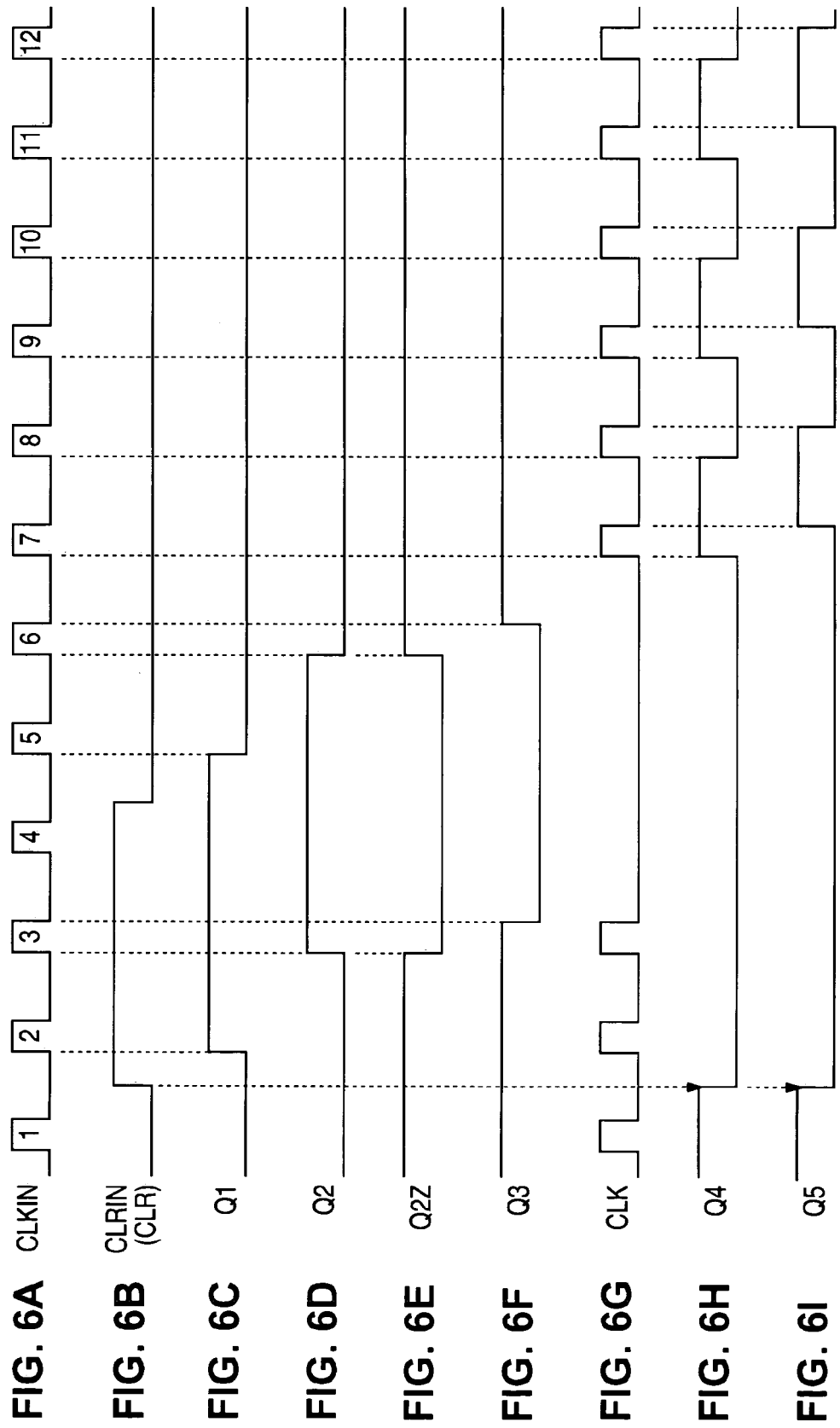
FIGS. 6A–6I are timing diagrams illustrating the operation of synchronizer 500 and target system 510 in accordance with the present invention.

FIG. 5 shows a block diagram that illustrates an example of a synchronizer 500 in accordance with the present invention. As described in greater detail below, the present invention simultaneously initializes rising edge triggered flip-flops and falling edge triggered flip-flops located in a target system. This is accomplished by holding the clock signal low for a time interval during which the rising/falling edge triggered flip-flops of the target system receive a clear signal. Thus, on the next rising edge of the clock signal, rising edge triggered flip-flops and falling edge triggered flip-flops will both be in the cleared state.

As shown in FIG. 5, synchronizer 500 includes a buffer U1 that has an input connected to receive a clear signal CLRIN, and an output that generates a buffered clear signal CLR. In addition, synchronizer 500 also includes a first flip-flop FF1 that has a D input connected to the output of buffer U1, and a clock input connected to receive a clock signal CLKIN. Furthermore, flip-flop FF1 also includes a Q output that generates a flip-flop output signal Q1. The clear signal CLRIN is asynchronous with respect to the clock signal CLKIN.

As shown in FIG. 5, synchronizer 500 also includes a second flip-flop FF2 that has a D input connected to the Q output of flip-flop FF1, and a clock input connected to receive the clock signal CLKIN. In addition, flip-flop FF2 also has a QZ output that generates a flip-flop output signal Q2Z. Furthermore, synchronizer 500 also includes a third flip-flop FF3 that has a D input connected to the QZ output of flip-flop FF2, and an inverted clock input connected to receive the clock signal CLKIN. In addition, flip-flop FF3 has a Q output that generates a flip-flop output signal Q3.

Synchronizer 500 additionally includes a logic NAND gate U2 and an inverter U3. NAND gate U2 has an output, a first input connected to the Q output of flip-flop FF3, and a second input connected to receive the clock signal CLKIN. Inverter U3 has an input connected to the output of NAND gate U2, and an output that generates a clock signal CLK.

As shown in FIG. 5, synchronizer 500 outputs the buffered clear signal CLR and the clock signal CLK to a target system 510. In the present example, target system 510 is a simplified representation of all of the different logic devices that include both rising edge triggered flip-flops and falling edge triggered flip-flops. For example, these different logic devices can include counters, registers, decoders and control logic blocks.

Referring to FIG. 5, target system 510 includes a rising edge triggered flip-flop FF4 and a falling edge triggered flip-flop FF5, both of which are connected as divide-by-two counters. Rising edge triggered flip-flop FF4 has a QZ output which is connected to the D input of flip-flop FF4, a clock input connected to receive the clock signal CLK, a clear input CL connected to receive the buffered clear signal CLR, and a Q output that generates a flip-flop output signal Q4.

Falling edge triggered flip-flop FF5 has a QZ output which is connected to the D input of flip-flop FF5, an inverted clock input connected to receive the clock signal CLK, a clear input CL connected to receive the buffered clear signal CLR, and a Q output that generates a flip-flop output signal Q5.

In operation, in order for target system 510 to function correctly, flip-flops FF4 and FF5 must both be initialized to the cleared state at the same time—e.g. following the application of the asynchronous clear signal CLRIN. When this occurs, both flip-flops are considered to be "synchronized" because the relative phases of their Q outputs have a known relationship to each other. (In the present example, both flip-flops are simultaneously cleared).

For example, if flip-flops FF4 and FF5 were located inside two 10-bit counters driven by the same clock signal, both counters would be initialized to zero following the application and removal of the clear signal CLRIN. Furthermore, since one counter responds to positive clock edges while the other counter responds to negative clock edges, decoding logic driven by both counters would be capable of generating waveforms in which the output pulses change state every half clock cycle. This effectively doubles the clock rate because both edges of the clock are being used to generate output pulses.

In accordance with the present invention, FIGS. 6A–6I show timing diagrams that illustrate the operation of synchronizer 500 and target system 510. As shown in the figures, the flip-flop output signals Q4 and Q5 are immediately initialized to a logic zero in response to the rising edge of the clear signal CLRIN, thereby immediately clearing the target flip-flops FF4 and FF5.

Furthermore, the clear signal CLRIN is also synchronized with the rising edge of the clock signal CLKIN by flip-flops FF1 and FF2. Thus, as shown in FIGS. 6A–6I, when the clear signal CLRIN rises between the first and second pulses of the input clock signal CLKIN, the flip-flop output Q1 rises on the rising edge of the second clock pulse, and the flip-flop output Q2 rises on the rising edge of the third clock pulse.

On the falling edge of the third clock pulse, flip-flop FF3 stores the logic low generated by the QZ output of flip-flop FF2, and generates the flip-flop output signal Q3 as a logic low. When the flip-flop output signal Q3 goes low, the output of NAND gate U2 will be forced high, regardless of the logic state of the clock signal CLKIN. Furthermore, when the output of NAND gate U2 is being forced high, inverter U3 will invert this high state and output a logic low state, thereby disabling the clock signal CLK.

This disabled clock condition continues to remain in effect, even after the clear signal CLRIN has just fallen. In the present example, the clear signal CLRIN lasts for three clock periods. Thus, after the clear signal CLRIN falls, it takes the next two falling clock edges of the CLKIN signal before the flip-flop output signal Q3 can rise again. Thus, after the flip-flop output signal Q3 has risen, the NAND gate U2 will become half-enabled because its Q3 input has gone high. Therefore, on the next rising edge of the CLKIN signal, NAND gate U2 will become fully enabled, and its output will go low. When the output of NAND gate U2 goes low, the output of inverter U3 will go high, thereby re-enabling the clock signal CLK (e.g. causing the clock signal CLK to go high).

When the clock signal CLK resumes, at the seventh CLKIN pulse in the present example, the flip-flops of target system 510 have been successfully initialized because both of them have been set to a known state (e.g. logic low state) before the next rising edge of the clock signal CLK.

Thus, in accordance with the present invention, synchronizer 500 activates the target system clear signal CLR during an initial time interval, while also disabling the target system clock signal, by forcing it to the logic low state. This ensures that, in the target system, all rising edge triggered flip-flops and falling edge triggered flip-flops will be properly initialized. In other words, since the target system flip-flops are not being clocked, and they are also being cleared, they will enter the cleared state and remain in that state.

Furthermore, when the target system clear signal CLR is removed, the target system clock signal CLK continues to be held low until two pulses of the input clock signal CLKIN have occurred. Thus, beginning with the next (third) CLKIN pulse, the target system clock signal CLK is enabled, thereby providing glitch free clock pulses to the target flip-flops, which were previously initialized.

Figure 7:
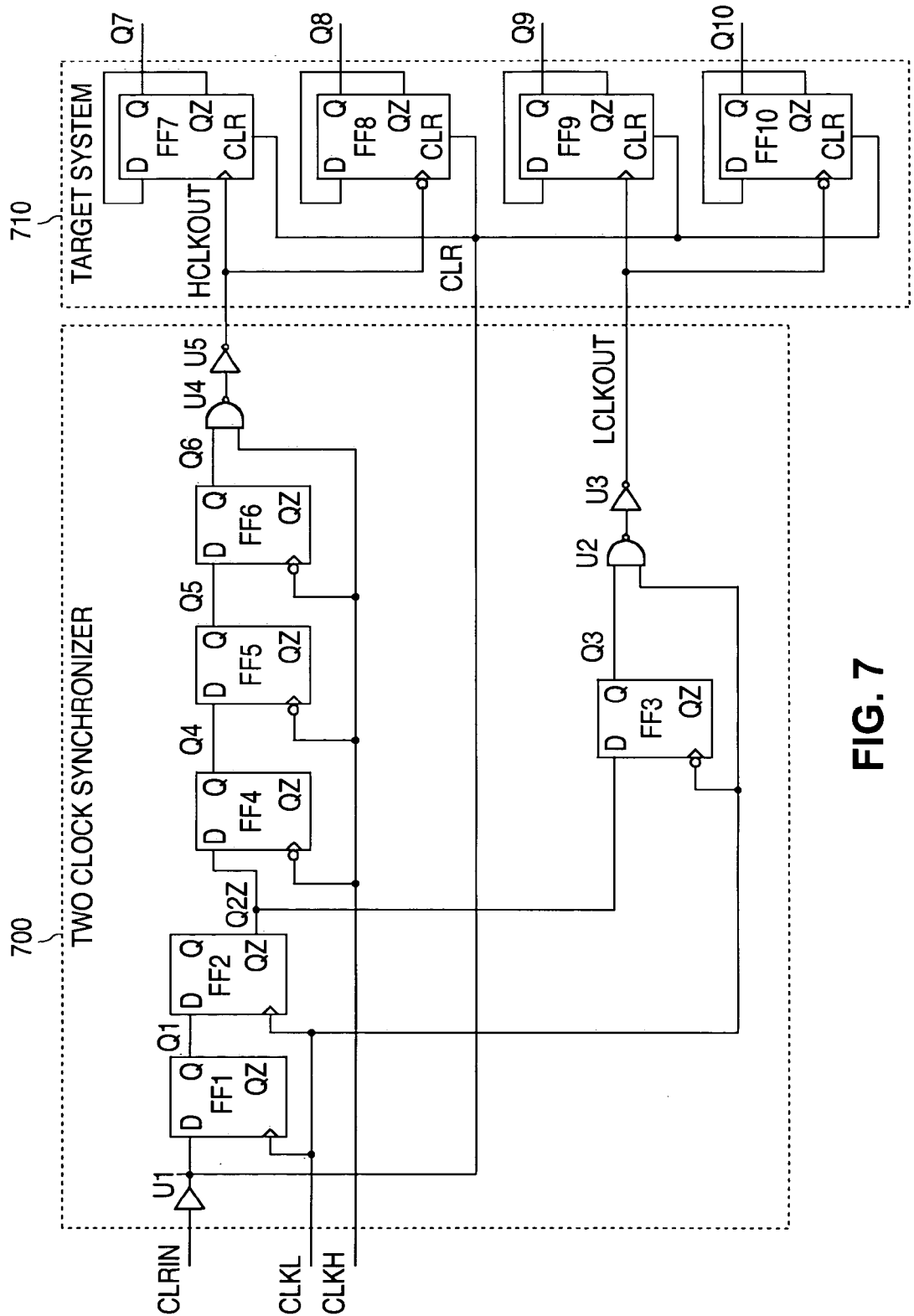
FIG. 7 is a block diagram illustrating an example of a multiple-clock synchronizer 700 in accordance with the present invention.

Synchronizer 500 can be adapted to work in target systems that contain multiple clock signals. Furthermore, each of the multiple clock signals can drive rising edge triggered flip-flops and falling edge triggered flip-flops. Thus, in accordance with the present invention, FIG. 7 shows a block diagram that illustrates an example of a multiple-clock synchronizer circuit 700.

Synchronizer 700 is similar to synchronizer 500 and, as a result, utilizes the same reference numerals to designate the structures that are common to both synchronizers. As shown in FIG. 7, synchronizer 700 differs from synchronizer 500 in that flip-flops FF1, FF2, and FF3 receive a low clock signal CLKL in lieu of the clock signal CLKIN, and inverter U3 generates a low frequency clock signal LCLKOUT in lieu of the clock signal CLK.

Furthermore, synchronizer 700 also includes three additional flip-flops, FF4, FF5 and FF6, a second NAND gate U4, and a second inverter U5. Flip-flop FF4 has a D input connected to the QZ output of flip-flop FF2, and an inverted clock input connected to receive a high frequency clock signal CLKH. In addition, flip-flop FF4 also has a Q output that generates a flip-flop output signal Q4.

Flip-flop FF5 has a D input connected to the Q output of flip-flop FF4, and an inverted clock input connected to receive the high frequency clock signal CLKH. In addition, flip-flop FF5 also has a Q output that generates the flip-flop output signal Q5. Furthermore, flip-flop FF6 has a D input connected to the Q output of flip-flop FF5, and an inverted clock input connected to receive the high frequency clock signal CLKH. In addition, flip-flop FF6 also has a Q output that generates a flip-flop output signal Q6.

Referring to FIG. 7, NAND gate U4 has an output, a first input connected to the Q output of flip-flop FF6, and a second input connected to receive the high frequency clock signal CLKH. Furthermore, inverter U5 has an input connected to the output of NAND gate U4, and an output that generates a high frequency clock signal HCLKOUT.

In the present example, the high frequency clock signal CLKH has a higher frequency than the low frequency clock signal CLKL. For example, the high frequency clock signal CLKH could be ten times the frequency of the low frequency clock signal CLKL. In addition, the clear signal CLRIN is asynchronous to the low frequency clock signal CLKL and the high frequency clock signal CLKH.

As shown in FIG. 7, synchronizer 700 outputs the following three signals to a target system 710: the buffered clear signal CLR, the low frequency clock signal LCLKOUT, and the high frequency clock signal HCLKOUT. As further shown in FIG. 7, target system 710 also includes a rising edge triggered flip-flop FF7 and a falling edge triggered flip-flop FF8, both of which are connected as divide-by-two counters.

Rising edge triggered flip-flop FF7 has a D input connected to the QZ output of flip-flop FF7, and a clock input connected to receive the high frequency clock signal HCLKOUT. In addition, flip-flop FF7 also has a clear input connected to receive the buffered clear signal CLR, and a Q output that generates a flip-flop output signal Q7.

Falling edge triggered flip-flop FF8 has a D input connected to the QZ output of flip-flop FF8, and an inverted clock input connected to receive the high frequency clock signal HCLKOUT. In addition, flip-flop FF8 also has a clear input connected to receive the buffered clear signal CLR, and a Q output that generates a flip-flop output signal Q8.

Target system 710 additionally includes a rising edge triggered flip-flop FF9 and a falling edge triggered flip-flop FF10, both of which are connected as divide-by-two counters. Rising edge triggered flip-flop FF9 has a D input connected to the QZ output of flip-flop FF9, a clock input connected to receive the low frequency clock signal LCLKOUT, and a clear input connected to receive the buffered clear signal CLR. In addition, flip-flop FF9 also has a Q output that generates a flip-flop output signal Q9.

Falling edge triggered flip-flop FF10 has a D input connected to the QZ output of flip-flop FF10, an inverted clock input connected to receive the low frequency clock signal LCLKOUT, and a clear input connected to receive the buffered clear signal CLR. In addition, flip-flop FF10 also has a Q output that generates a flip-flop output signal Q10.

In operation, in order for target system 710 to function correctly, flip-flops FF7, FF8, FF9, and FF10 must each be initialized to the cleared state following the application and removal of the asynchronous clear signal CLRIN. When this occurs, the flip-flops are considered to be "synchronized" because the relative phases of their Q outputs have a known relationship to each other.

In accordance with the present invention, FIGS. 8A–8P show timing diagrams that illustrate the operation of synchronizer 700 and target system 710. As shown in the figures, the flip-flop outputs Q7, Q8, Q9 and Q10 are immediately initialized to a logic zero in response to the rising edge of the clear signal CLRIN, thereby immediately clearing the target flip-flops FF7, FF8, FF9 and FF10.

Furthermore, flip-flops FF1–FF3 and logic gates U1–U3 of synchronizers 500 and 700 are identically connected. Thus, from a behavioral standpoint and a timing standpoint, the low frequency clock signal LCLKOUT generated by synchronizer 700 behaves the same as the clock signal CLK generated by synchronizer 500.

As shown in FIGS. 8A–8P, flip-flops FF1 and FF2 synchronize the clear signal CLRIN with respect to the rising edge of the low frequency clock signal CLKL. Thus, when the clear signal CLRIN rises between the first and second pulses of the input clock signal CLKL, the flip-flop output Q1 rises on the rising edge of the second CLKL pulse, and the flip-flop output Q2Z falls on the rising edge of the third CLKL pulse.

After the flip-flop output Q2Z has fallen, on the next falling edge of the high frequency clock signal CLKH, flip-flop FF4 stores the logic low on the Q2Z output, generating the flip-flop output signal Q4 as a logic low. In addition, on the next falling edge of the high frequency clock signal CLKH, flip-flop FF5 stores the logic low generated by the Q output of flip-flop FF4, and generates the flip-flop output signal Q5 as a logic low. Furthermore, on the next falling edge of high frequency clock signal CLKH, flip-flop FF6 stores the logic low generated by the Q output of flip-flop FF5, and generates the flip-flop output signal Q6 as a logic low.

Since the flip-flop output signal Q6 is at a logic low, the output of NAND gate U4 will remain at a logic high regardless of the logic state of the high frequency clock signal CLKH. Thus the logic high at the output of NAND gate U4 is inverted to a logic low by inverter U5, thereby disabling the high frequency clock signal HCLKOUT.

This condition continues, and remains in effect even after the clear signal CLRIN falls. In the present example, the clear signal CLRIN lasts for three periods of the low frequency clock CLKL. Thus, as shown in FIGS. 8A–8P, after the clear signal CLRIN has fallen, the low frequency clock signal LCLKOUT will not be enabled until two rising edges of the low frequency clock signal CLKL have occurred. Furthermore, the high frequency clock signal HCLKOUT will not be enabled until two rising edges of the low frequency clock signal CLKL have occurred, and three falling edges of the high frequency clock signal CLKH have occurred.

When the low frequency clock signal LCLKOUT and the high frequency clock signal HCLKOUT both resume, the flip-flops FF7–FF10 of target system 710 have been successfully initialized (e.g. cleared in the current example). This is true because the flip-flop output signals Q7–Q10 were each set to a known state before the next rising edge, or falling edge, of the clock signals CLKL and CLKH.

Referring to FIG. 7, flip-flops FF4 and FF5 are implemented as falling edge triggered flip-flops instead of rising edge triggered flip-flops. One advantage of using this logic configuration is that it allows more time for the flip-flop output signal Q5 to become valid. In other words, when flip-flops FF4 and FF5 are falling edge triggered flip-flops, the flip-flop output signal Q5 has almost the entire period of the high frequency clock signal CLKH to become valid. Alternately, if flip-flops FF4 and FF5 were implemented as rising edge triggered flip-flops, the flip-flop output signal Q5 would only have one-half of the CLKH period to become valid.

Although FIGS. 5 and 7 illustrate examples of initializing target flip-flops to the cleared (logic low) state, those knowledgeable in the state of the art will appreciate that the target flip-flops could have also been initialized to the set (logic high) state. Furthermore, by utilizing the current invention, some target flip-flops can be initialized to the logic low state while others are simultaneously initialized to the logic high state. Of course, those practicing the state of the art will also appreciate that the set and clear inputs of the target flip-flops can be active high inputs or active low inputs, in any combination.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A synchronizer comprising:
   a first flip-flop having a data input, a clock input, and a data output;
   a second flip-flop having a data input connected to the data output of the first flip-flop, a clock input connected to the clock input of the first flip-flop, a data output, and an inverse data output; and
   a third flip-flop having a data input connected to the inverse data output of the second flip-flop, an inverted clock input connected to the clock input of the first flip-flop, and a data output.

2. The synchronizer of claim 1 and further comprising a first logic device connected to the clock inputs of the first and second flip-flops, the inverted clock input of the third flip-flop, and the data output of the third flip-flop.

3. The synchronizer of claim 2 wherein the first logic device is a NAND gate.

4. The synchronizer of claim 3 and further comprising a second logic device connected to the first logic device, the second logic device inverting an output signal generated by the first logic device.

5. The synchronizer of claim 4 and further comprising a target system, the target system having:
   a fourth flip-flop having a data input, a clock input connected to the second logic device, a data output, and an inverted data output connected to the data input of the fourth flip-flop; and
   a fifth flip-flop having a data input, an inverted clock input connected to the second logic device, a data output, and an inverse data output connected to the data input of the fifth flip-flop.

6. The synchronizer of claim 5 wherein the fourth flip-flop has a clear input and the fifth flip-flop has a clear input connected to the clear input of the fourth flip-flop and the data input of the first flip-flop.

7. The synchronizer of claim 1 and further comprising a logic circuit having an output, an input connected to the clock inputs of the first and second flip-flops, and the inverted clock input of the third flip-flop, and an input connected to the data output of the third flip-flop.

8. The synchronizer of claim 7 and further comprising a target system, the target system having:
   a fourth flip-flop having a data input, a clock input connected to the output of the logic circuit, and a data output; and
   a fifth flip-flop having a data input, an inverted clock input connected to the output of the logic circuit, and a data output.

9. The synchronizer of claim 8 wherein the fourth flip-flop has a clear input and the fifth flip-flop has a clear input connected to the clear input of the fourth flip-flop and the data input of the first flip-flop.

10. The synchronizer of claim 1 and further comprising:
    a fourth flip-flop having a data input connected to the inverted data output of the second flip-flop, an inverted clock input, and a data output;
    a fifth flip-flop having a data input connected to the data output of the fourth flip-flop, an inverted clock input connected to the inverted clock input of the fourth flip-flop, and a data output; and
    a sixth flip-flop having a data input connected to the data output of the fifth flip-flop, an inverted clock input connected to the inverted clock input of the fifth flip-flop, and a data output.

11. The synchronizer of claim 10 and further comprising:
    a first logic circuit having an output, an input connected to the clock inputs of the first and second flip-flops and the inverted clock input of the third flip-flop, and an input connected to the data output of the third flip-flop; and
    a second logic circuit having an output, an input connected to the inverted clock inputs of the fourth, fifth, and sixth flip-flops, and an input connected to the data output of the sixth flip-flop.

12. The synchronizer of claim 11 and further comprising a target system, the target system having:
    a seventh flip-flop having a data input, a clock input connected to the output of the first logic circuit, a clear input connected to the data input of the first flip-flop, and a data output;
    an eighth flip-flop having a data input, an inverted clock input connected to the output of the first logic circuit, a clear input connected to the data input of the first flip-flop, and a data output;
    a ninth flip-flop having a data input, a clock input connected to the output of the second logic circuit, a clear input connected to the data input of the first flip-flop, and a data output;
    a tenth flip-flop having a data input, an inverted clock input connected to the output of the second logic circuit, a clear input connected to the data input of the first flip-flop, and a data output.

13. A method of synchronizing signals comprising:
    receiving a first clock signal, the first clock signal having a clock period;
    outputting a second clock signal in response to the first clock signal, the second clock signal having a clock period, and alternating between a pair of logic states;
    receiving a control signal;
    holding the second clock signal to one logic state for more than one clock period of the second clock signal after the control signal changes from a first logic state to a second logic state; and
    releasing the second clock signal to alternate between the pair of logic states after the control signal changes from the second logic state back to the first logic state.

14. The method of claim 13 wherein:
    the second clock signal is held for a hold time that begins more than one clock period of the first clock signal after the control signal changes from the first logic state to the second logic state; and
    the hold time ends more than one clock period of the first clock signal after the control signal changes from the second logic state to the first logic state.

15. The method of claim 13 wherein the first and second clock periods are equal.

16. The method of claim 13 wherein the second clock signal is received by a non-inverting clock input of a first flip flop and an inverting input of a second flip flop.

17. The method of claim 13 wherein the control signal is asynchronous with respect to the first clock signal.

18. The method of claim 13 and further comprising:
    receiving a third clock signal, the third clock signal having a clock period that is shorter than the clock period of the first clock signal;

outputting a fourth clock signal in response to the first clock signal and the third clock signal, the fourth clock signal having a clock period;

holding the fourth clock signal to one logic state for more than one clock period of the fourth clock signal after the control signal changes from a first logic state to a second logic state; and releasing the fourth clock signal after the control signal changes from the second logic state back to the first logic state.

19. The method of claim 18 wherein:

the fourth clock signal is held for a freeze time that begins more than one clock period of the third clock signal after the control signal changes from the first logic state to the second logic state; and the freeze time ends more than one clock period of the third clock signal after the control signal changes from the second logic state to the first logic state.

20. The method of claim 18 wherein the first and second clock periods are equal, and the third and fourth clock periods are equal.

21. The method of claim 18 wherein:

the second clock signal is received by a non-inverting clock input of a first flip flop and an inverting input of a second flip flop; and the fourth clock signal is received by a non-inverting clock input of a third flip flop and an inverting input of a fourth flip flop.

22. The method of claim 18 wherein the control signal is asynchronous with respect to the first and third clock signals.

23. The method of claim 18 wherein:

the second clock signal is held for a hold time that begins more than one clock period of the first clock signal after the control signal changes from the first logic state to the second logic state;

the fourth clock signal is held for a freeze time that begins more than one clock period of the third clock signal after the control signal changes from the first logic state to the second logic state; and the hold time is greater than the freeze time.

* * * * *